Oct. 17, 1967  R. H. MARTIN  3,348,082
ELECTRIC MOTOR HOUSING AND SUPPORT
Filed May 5, 1965  2 Sheets-Sheet 1

INVENTOR.
RAND H. MARTIN
BY Warren T. Jessup
ATTORNEY

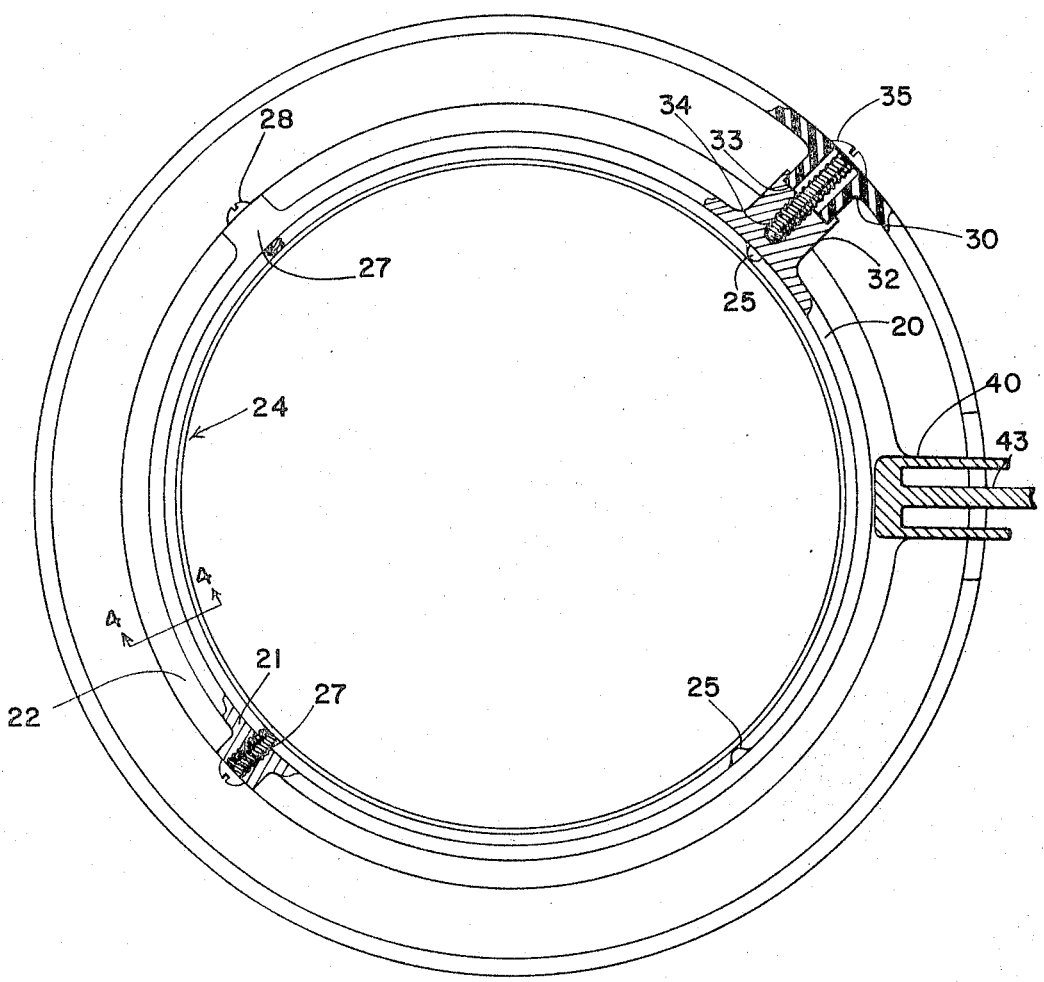
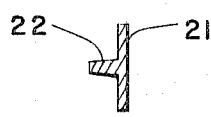
FIG. 3
FIG. 4

United States Patent Office

3,348,082
Patented Oct. 17, 1967

3,348,082
ELECTRIC MOTOR HOUSING AND SUPPORT
Rand H. Martin, Monterey Park, Calif., assignor to HPE Inc., El Monte, Calif., a corporation of California
Filed May 5, 1965, Ser. No. 453,288
1 Claim. (Cl. 310—85)

ABSTRACT OF THE DISCLOSURE

This invention relates to providing a splash proof housing for an electrical motor that may be attached to the wall of an above-ground swimming pool.

---

This invention relates in general to electric motor construction, but relates more specifically to a support stand and decorative, protective covering combination for electric motors.

Electrical devices in the vicinity of water must be protected with extraordinary care, not only to prevent damage to the motor, but also to prevent electrocution of people using the facilities near the motor.

Above-ground, home-type swimming pools, which are very popular and widely used, require filtering and water-treating devices. It has been the custom to provide electrically-driven pumps and to place such devices along the side of the pool on the ground that supports the pool. Supply and return pipes for a centrifugal pump driven by such a motor, for example, then extend upwardly over the side of the pool and into the water.

In such a position, a motor is subject to rainfall and splashing by exuberant swimmers. Furthermore, the motor in this position is a hazard to the swimmers in that running children often are negligent enough in their attention that they stumble over the motor. Hence, the motor is a hazard to the occupants of the pool, and the occupants of the pool are a hazard to the motor.

It is an object of this invention to provide a protective hood for the motor in order to encase the motor in a cover to protect the motor against falling water.

It is still a further object of the invention to decorate the motor in order to blend the power device into the general decor of the more attractively designed home-type pools.

It is yet another object of this invention to provide a supporting structure which will accept a hanger device to support the motor along the side of the pool, or alternatively when the pool will not admit of such weight hanging on the side, to accept conventional leg devices for sitting the motor on the ground surface.

In accordance with these and other objects which will become apparent hereinafter, a preferred form of the present invention is disclosed in the accompanying drawings wherein:

FIGURE 3 is a schematic section taken substantially along the line 3—3 of FIGURE 1, showing the relationship of the cover and the internal rib structure of this invention in a slightly modified form; and FIGURE 4 is a section taken along line 4—4 of FIGURE 3.

The drawings illustrate the adaptation of the invention to a hanging support for positioning an electrically-powered centrifugal pump on the side wall of an above-ground type swimming pool.

Figure 1:
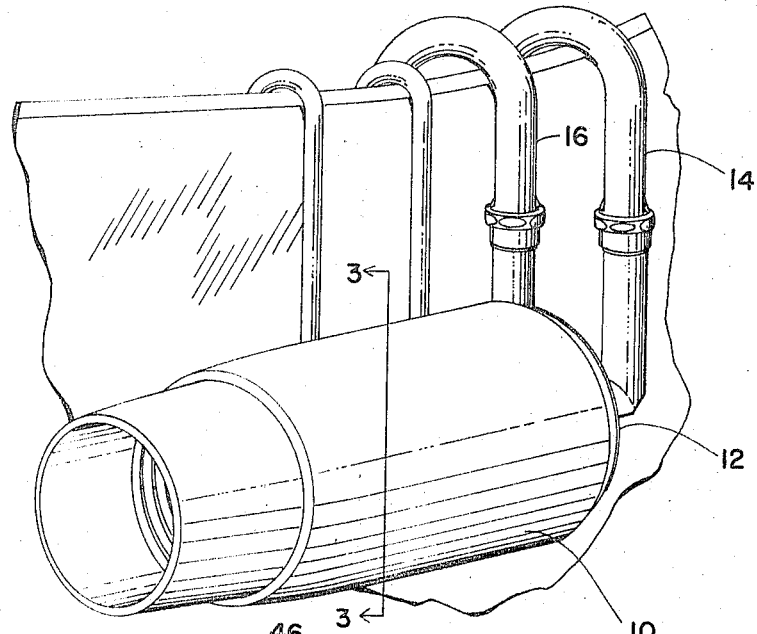
FIGURE 1 is an isometric view of the combination housing and support as applied to a motor and pump hung from the side of a domestic-type pool.

The general appearance of the finished combination is best shown in FIGURE 1, wherein a housing 10 is shown as an impervious water-protecting cover for an electric motor operating a centrifugal pump 12. An intake line 14 to pump 12, and a pressure return line 16 back to the pool, provide for water transport, but are not normally employed to support the motor and pump.

Figure 2:
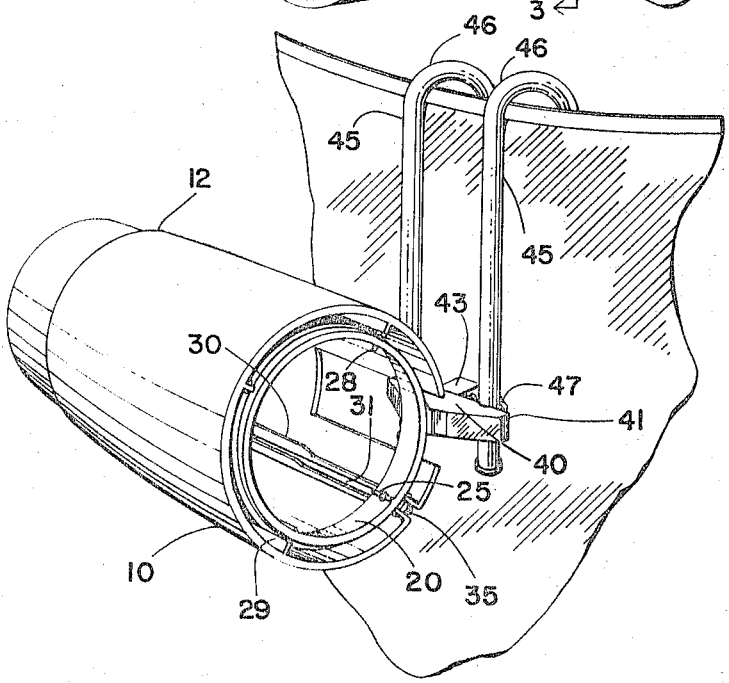
FIGURE 2 is a schematic isometric from the front quarter of the housing and support, with the pump and motor removed for illustration of the housing detail.

FIGURE 2 is schematic in that the housing 10 is shown, but there is no motor shown in the housing. However, the motor is conventional in structure and the FIGURES 2 and 3 better illustrate the invention without the drawing being encumbered by details of electrical motor construction.

Referring to the FIGURES 2 and 3, a girth band 20, which is the central construction around which the invention is built, is shown as having a wide, flat band section 21. The band is provided with an annular back rib 22, which gives extra strength and rigidity to the band section 21.

In order to illustrate the function of the housing and girth band combination, a motor is simulated by a ring 24. The outer housing of the motor may be considered to be a ring of steel, and thus the ring 24 will simulate that motor.

Refer to FIGURE 3, on the inner surface of the band section 21, lateral ridges 25 extend across the band section at about a 90° spacing. These two ridges provide a seat, or stand, upon which the motor band 24 may rest. Thus, exact fit or erratic contact is eliminated.

Opposite each of the ridges 25 is a boss 27. Each boss 27 is drilled and tapped to accept a set screw 28. The two screws 28 are directed diametrically across the girth band 20 to the opposite ridge 25, and, therefore, as the screw is caused to extend through the boss 27, it will contact the motor ring 24 and press the ring tightly upon the seat formed by the two ridges 25. By use of two such screws 28 in opposite position from the ridges 25, a tight grip is maintained with the least distortion of the girth band 20.

Housng 10 is provided with stiffening ribs 29 on the interior. A double rib 30, as best seen in FIGURE 3, extends along the housing. The girth band 20 has an enlarged lug 32 with a slotted seat 33 extending laterally of the lug 32. Thus, the double rib 30 and the slot 33 both have longitudinal axes extending in the direction of the axis of the girth band 20. Note in FIGURE 3 that the width of slot 33 is a close fit to the outer dimension of the double ribs 30. Thus, the housing 10 is provided with a closely-guided seat upon the girth band. The housing 10 is slotted between the ribs of double rib 30. The slot may be positioned downwardly, as in FIGURE 2, or if access is desired, upwardly as shown in FIGURE 3.

The lug 32 is drilled and tapped to provide threaded opening 34. A screw 35 is engaged into opening 34, and then the housing placed over the electric motor, held in band 20 to a proper longitudinal relationship by aligning slot 31 with screw 35. Thus, the screw may then be tightened and housing 10 securely clamped to the girth band 20.

The prospective view of FIGURE 2 will illustrate the nature of a leg-mounting bracket 40. In FIGURE 3, a section is shown through the leg-mounting bracket 40.

Bracket 40 has an elongated structural form ending at clamp ends 41. A spacer tongue 43 extends from between the ends 41 and is employed to contact the side of the pool when used as shown in FIGURES 1 and 2.

Hanger rods 45 are provided with hook ends 46 in order to hang over the side of the pool. The rods 45 will not cling tightly to the side of the pool because hook ends 46 are formed as a general crook with a relatively large radius. Accordingly, the rods 45 would normally extend at an angle with respect to the side of the pool and have a detrimental appearance. According to the construction of the bracket 40, the spacer 43 extends out to project against the side of the pool and provide the necessary abutment to hold the rods 45 in a substantially parallel position.

The rods 45 are engaged onto the clamp ends 41 by means of the clamp covers 47 and are thereby adjustable so as to position the motor at the most appropriate height to accommodate the water line 14 and 16.

While the instant invention has been shown and described herein in what is conceived to be the most practical and preferred embodiments, it is recognized that departures may be made therefrom within the scope of the invention which is, therefore, not to be limited to the details disclosed herein but is to be afforded the full scope of the invention as hereinafter claimed.

What is claimed is:

A splash proof housing for an electrical motor comprising:

(1) a cylindrical housing surrounding the electrical motor in the axial direction;
(2) an adjustable mounting ring means for clamping said housing in a spaced relation to the electrical motor;
(3) a mounting bracket attached to said adjustable ring;
(4) vertical hanger bars having hook means at the upper end for hooking over a support wall;
(5) clamp means on said bracket for clamping said bracket and ring means to said hanger bars; and
(6) a spacer on the said bracket extending away from said ring means to contact the support wall and keep said hanger bars and bracket spaced from the wall.

References Cited

UNITED STATES PATENTS

| | | | |
|---|---|---|---|
| 1,739,082 | 12/1929 | Simmons | 310—91 |
| 1,860,883 | 5/1932 | Bilde | 310—91 |
| 2,804,559 | 8/1957 | Brewer | 310—89 |
| 2,932,750 | 4/1960 | Eisenhart | 310—89 |
| 3,047,753 | 7/1962 | Westell | 310—89 |

MILTON O. HIRSHFIELD, *Primary Examiner.*

J. D. MILLER, *Assistant Examiner.*